(12) United States Patent
Nix

(10) Patent No.: US 8,984,839 B2
(45) Date of Patent: Mar. 24, 2015

(54) REFLECTING PARABOLIC SPLICE SOLAR SMELTER

(71) Applicant: Martin E. Nix, Seattle, WA (US)

(72) Inventor: Martin E. Nix, Seattle, WA (US)

( * ) Notice: Subject to any disclaimer, the term of this patent is extended or adjusted under 35 U.S.C. 154(b) by 220 days.

(21) Appl. No.: 13/815,582

(22) Filed: Mar. 11, 2013

(65) Prior Publication Data

US 2014/0251312 A1    Sep. 11, 2014

(51) Int. Cl.
*F24J 2/02* (2006.01)
*F24J 2/13* (2006.01)

(52) U.S. Cl.
CPC .... *F24J 2/02* (2013.01); *F24J 2/13* (2013.01); *Y02E 10/40* (2013.01)
USPC ............................................. 52/681; 126/690

(58) Field of Classification Search
USPC ......... 126/617, 618, 680, 681, 684, 689, 690, 126/400, 620, 692, 696
See application file for complete search history.

(56) References Cited

U.S. PATENT DOCUMENTS

| | | | | | |
|---|---|---|---|---|---|
| 3,118,437 | A | * | 1/1964 | Hunt | 126/600 |
| 4,137,902 | A | * | 2/1979 | Bunch | 126/605 |
| 4,192,583 | A | * | 3/1980 | Horton | 353/3 |
| 4,378,790 | A | * | 4/1983 | Erwin | 126/681 |
| 4,848,320 | A | * | 7/1989 | Burns et al. | 126/682 |
| 5,113,845 | A | * | 5/1992 | Nix | 126/681 |
| 5,308,187 | A | * | 5/1994 | Nix | 404/17 |
| 7,337,843 | B2 | * | 3/2008 | Mecham et al. | 166/302 |
| 8,360,052 | B2 | | 1/2013 | Nix | |
| 2005/0284145 | A1 | * | 12/2005 | Repetto et al. | 60/641.8 |

OTHER PUBLICATIONS

U.S. Appl. No. 12/459,719, filed Feb. 16, 2012, Nix.
U.S. Appl. No. 11/634,312, filed Jun. 5, 2008, Nix.

* cited by examiner

*Primary Examiner* — William Gilbert

(57) ABSTRACT

A revolution-of-a-parabolic-curve is sliced by two planes to form a reflecting-parabolic-splice-solar-smelter so as to focus the sun's noon light to a crucible for smelting rocks, glass and metals and for processing of chemicals, using zero degrees of freedom. (50 words)

1 Claim, 5 Drawing Sheets

REFLECTING PARABOLIC SPLICE SOLAR SMELTER

FIELD OF INVENTION

A reflecting-parabolic-solar-smelter is developed using two planes to splice a revolution-of-a-parabolic-curve at the approximately 45 degree tangent and the approximately 30 degree tangent so as to concentrate the sun's noon light to a crucible without the use of moving components.

PRIOR ART

The invented device improves upon existing art.

Nix (U.S. patent application Ser. No. 12/459,719 Filing date Jul. 7, 2009) illustrates a reflecting-parabolic-half-shell with a reflecting-curved-overhang. Illustrated is a tiled-floor with a transparent top, to help keep a thermal-mass hot. Positioned from the open-void created by the interior wall of the reflecting-parabolic-half-shell and the interior wall of the reflecting-curved-overhang is a heliostat or a tilt-able-planar-reflector rotating on a turntable, moving in four degrees of freedom.

Nix (U.S. Pat. No. 8,360,052, issued Jan. 29, 2013) illustrates a reflecting-parabolic-half-shell with a tilt-able-planar-reflector, which is round in shape, and rotating about a central axis. The tilt-able-planar-reflector is hinged, adjacent and attached to the reflecting-parabolic-half-shell, moving in four degrees of freedom.

Nix (U.S. patent application Ser. No. 11/634,312, Filing date Dec. 5, 2006) FIG. 9A and FIG. 9B and Paragraph [0209] illustrate a reflecting-parabolic-half-shell with a tilt-able-planar-reflector hinged, attached, and rotatable about a central axis on a turntable, moving in four degrees of freedom.

Nix, Nix, and Nix capture the sun's light, and redirect the sun's light to a crucible. All three utilize four degrees of freedom. Nix, Nix, and Nix have the reflecting-parabolic-half-shell base, or foundation, horizontal to the ground. Nix, Nix, and Nix have the open-void tilted to 90 degrees. Unlike Nix, Nix, Nix, the invented device has the open-void tilted at the approximately 60 degree angle. The invented device is static, with the open-void orient able to capture the sun's noon light. Unlike Nix, Nix, Nix, the invented device does not utilize a moveable tilt-able-planar-reflector. The net result is the sun's concentrated light is focused to a crucible to smelt rocks, glass or metals, and to process chemicals, without the need for moving components. The invented device moves in zero degrees of freedom. Thus, is new and novel.

SUMMARY OF THE INVENTION

A parabolic-curve is rotated forming a revolution-of-a-parabolic-curve. A revolution-of-a parabolic-curve is spliced by two planes, forming a reflecting-parabolic-splice-solar-smelter. The interior wall of the revolution-of-a-parabolic-curve is reflective and reflects the sun's noon light to a crucible located at the focal. The reflecting-parabolic-splice-solar-smelter is developed by the revolution-of-a parabolic-curve, and then by splicing with a first-plane at the approximately 30 degree tangent, forming the base, or foundation. The revolution-of-a-parabolic-curve is extended to the approximately 45 degree tangent. A second-plane splices the revolution-of-a-parabolic-curve at the 45 degree tangent. The first-plane and second-plane splice the revolution-of-a-parabolic-curve interior wall. Where the first-plane and second-plane intersect, the tilt is approximately 60 degrees. An open-void is created by the boundaries of the interior wall of the revolution-of-a-parabolic-curve, the first-plane interior, and second-plane interior.

The open-void is tilted at approximately 60 degrees. The second-plane can vary in tilt, plus or minus approximately 20 degrees. If it is desired to capture more of the sun's noon light in winter, the tilt of the second-plane can be adjusted to approximately 80 degrees. If, however, the desire is to capture more of the sun's noon light in summer, the tilt of the second-plane can be adjusted to approximately 40 degrees. The orientation of the revolution-of-a-parabolic may also be orient able to the East to capture side light, as from the sun's sunrise light, or the sun's late morning light. The revolution-of-a-parabolic may also be orient able to the West to capture side light, as from the sun's sunset light, or the sun's early afternoon light.

It is not disadvantageous for the open-void to not be precisely aimed at the sun's noon elevation. If the sun's noon light is higher in elevation than the perpendicular of the tilt of the second-plane, the sun's noon light still enters the crucible. If the sun's noon light is lower in elevation than the perpendicular of the tilt of the second-plane, the sun's noon light still enters the crucible. While the sun's noon light may be more diffused and not as focused, still the energy from the concentrated sun's noon light is still hot enough to process chemicals, such as boiling water, treating waste, or cooking food. The sun's noon light, or stray rays, that do not enter the crucible, reflect to the tiled-floor, helping to keep the earth surrounding the crucible hot. A factor is the diameter of the crucible. The larger the diameter of the crucible more of the sun's noon light enters the crucible. The focal of the sun's noon light moves around inside the crucible according to the sun's elevation and season.

The sun's light from the side, as from sunrise, or late morning, can help pre-warm the crucible, and help to keep the tiled-floor hot. The sun's light from the side, as from sunset or early afternoon, can help keep the crucible hot. Any stray rays strike a tiled-floor, helping to keep the earth surrounding the crucible hot. The sun's light from the side is reflected from the wall of the revolution-of-a-parabolic to the crucible and to the tiled-floor. A factor is the diameter of the crucible. The larger the diameter of the crucible, more of the sun's light from the side enters. The focal of the sun's light from the side moves around according to the elevation of the sun's light and the season.

Thus, the revolution-of-a-parabolic-curve creates the reflecting-parabolic-splice-solar-smelter. The reflecting-parabolic-splice-solar-smelter is static, with the open-void orient able to the sun's elevation. The reflecting-parabolic-splice-solar-smelter has no need for moving components. The reflecting-parabolic-splice-solar-smelter has a base, or foundation, to support the weight and can be made of masonry. The exterior walls of the reflecting-parabolic-splice-solar-smelter can be surrounded by masonry. The floor, parallel to the first-plane, can be tiled, so as to capture any stray rays not captured by the crucible. The tiled-floor can be transparent, heating the earth underground with the sun's light. The net result is the sun's noon light is means to smelt rocks, glass or metals, and to process chemicals, without the need for moving components. The reflecting-parabolic-splice-solar-smelter concentrates the sun's noon light with zero degrees of freedom.

DETAILED DESCRIPTION OF THE INVENTION

Figure 1:
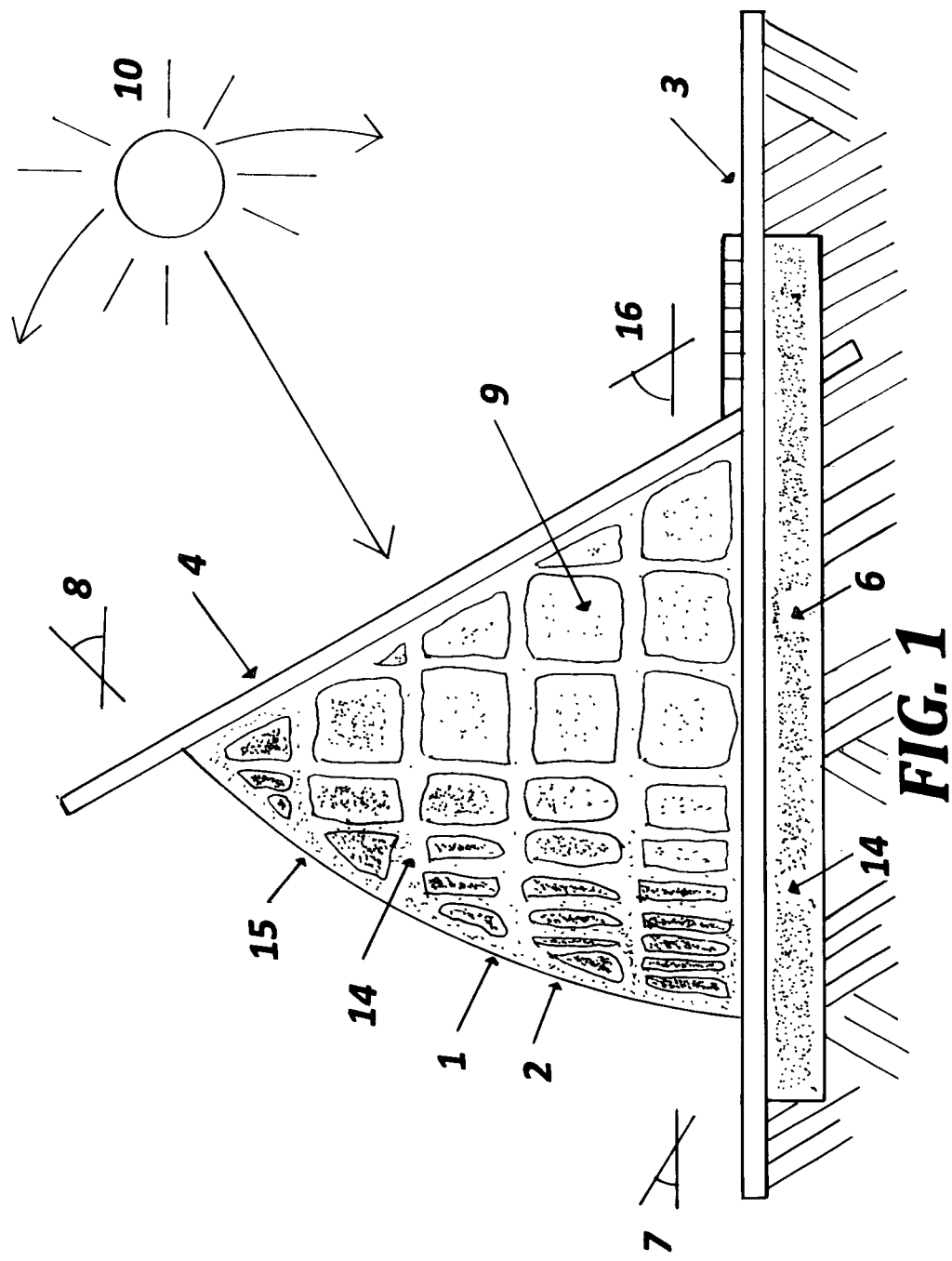
FIG. 1 illustrates a side view of the invented device. A revolution-of-a-parabolic-curve is spliced by a first-plane forming the base. The base can be masonry supporting the weight of the revolution-of-a-parabolic-curve, creating a foundation. The first-plane splices the interior wall of the revolution-of-a-parabolic-curve at the approximately 30 degree tangent. A second-plane splices the interior wall of the revolution-of-a-parabolic-curve at the approximately 45 degree tangent. Where the first-plane and second-plane intersect, the tilt is approximately 60 degrees. The revolution-of-a-parabolic-curve is tilted approximately 60 degrees, so as to capture the sun's noon light.

FIG. 1 illustrates a side view of a revolution-of-a-parabolic-curve (1), spliced by a first-plane (3) forming the base (6). The base (6) can be masonry (14) supporting the weight of the revolution-of-a-parabolic-curve (1), creating a foundation (6). The first-plane (3) splices the revolution-of-a-parabolic-curve (1) at the approximately 30 degree tangent (7). A second-plane (4) splices the revolution-of-a-parabolic-curve (1) at the approximately 45 degree tangent (8). The first-plane (3) and the second-plane (4) intersect the revolution-of-a-parabolic-curve (1) at the interior wall (15) of the revolution-of-a-parabolic-curve. (1). The revolution-of-a-parabolic-curve (1) is tilted approximately 60 degrees (16), so as to capture the sun's noon light (10). The intersection of the first-plane (3), and the second-plane (4) is approximately 60 degrees (16) in tilt. It should be noted that the revolution-of-a-parabolic (1), and reflecting-parabolic-splice-solar-smelter (2), can vary in orientation, and may be orient able to the East or West. The tilt of the approximately 60 degrees (16), may vary plus 20 degrees or minus 20 degrees. If it is desired to capture more sunlight in winter, the tilt (16) may be 80 degrees. If it is desired to capture more sunlight in the summer, the tilt (16) may be 40 degrees. Thus, the revolution-of-a-parabolic-curve (1) creates a reflecting-parabolic-splice-solar-smelter (2). An open-void (9) is bounded by the interior of the revolution-of-a-parabolic (1), the first-plane (3) interior, and the second-plane (4) interior. The open-void (9) is tilted at approximately 60 degrees (16), so as to capture the sun's noon light (10). The tilt (16) of the open-void (9) may vary plus 20 degrees or minus 20 degrees. The open-void (9) may be orient able to the East or West. The exterior of the reflecting-parabolic-splice-solar-smelter (2) can be supported by masonry (14).

Figure 2:
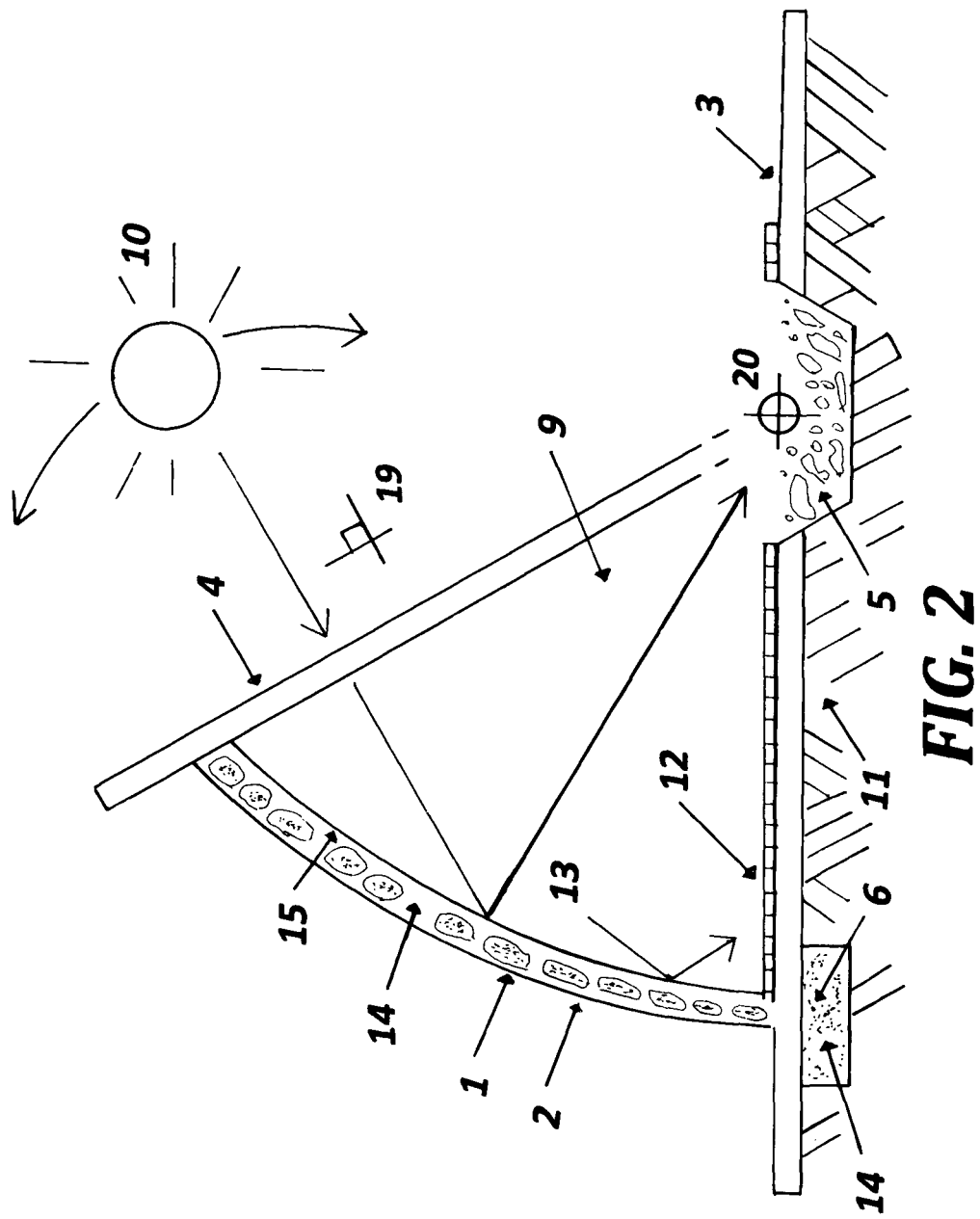
FIG. 2 illustrates a functional side view of the invented device. An open-void is bounded by the revolution-of-a-parabolic-curve, the first-plane, and the second-plane. Thus, the revolution-of-a-parabolic-curve creates a reflecting-parabolic-splice-solar-smelter. The open-void is tilted at approximately 60 degrees so as to capture the sun's noon light. The reflecting-parabolic-splice-solar-smelter is static, with the open-void orient able to the sun's noon light elevation. Thus, the sun's noon light is captured by the interior wall of the created open-void, thus the sun's noon light is reflected to a crucible located at the focal of the revolution-of-a-parabolic-curve. The crucible is embedded inside the earth, and surrounded by earth for insulation. Surrounding the crucible is a tiled-floor, which can be made of a transparent glazing, so as to capture any stray rays not focused onto the crucible. The tilted-floor is parallel to the first-plane. The exterior of the reflecting-parabolic-splice-solar-smelter can be supported by masonry. The net result is the sun's noon light is means to smelt rocks, glass or metals, and to process chemicals, without the need for moving components. The invented device moves in zero degrees of freedom.

FIG. 2. Illustrates a cross sectional side view of the invented device. It is not disadvantageous for the sun's elevation to be greater or less than the perpendicular to the tilt (19) of the second-plane (4). The sun's noon light (10) still enters the crucible (5), though it is more diffuse and less focused. There is still sufficient energy in the concentrated sun's noon light (10) to process chemicals, or to boil water, treat waste, or cook food. The sun's noon light (10) not entering the crucible (5) is captured by the tiled-floor (12). A factor is the diameter of the crucible (5). The larger the diameter of the crucible (5), more of the sun's noon light (10) that is greater or less than the perpendicular to the tilt (19) of the second-plane (4) enters.

The reflecting-parabolic-splice-solar-smelter (2) is static, with the open-void (9) orient able to the sun's noon elevation (10). Thus, the sun's noon light (10) is captured by the interior wall (15) of the created open-void (9). And thus, the sun's noon light (10) is redirected to a crucible (5) located at the focal (20) of the revolution-of-the-parabolic-curve (1). The crucible (5) is embedded inside the earth (11), and surrounded by earth (11) for insulation. Surrounding the crucible (5) is a tiled-floor (12), which can be made of a transparent glazing, so as to capture any stray rays (13) not focused onto the crucible (5). The tiled-floor (12) helps to keep the earth (11), which surrounds the crucible (5), hot. The tiled-floor (12) is parallel to the first-plane (3). The exterior of the reflecting-parabolic-splice-solar-smelter (2) can be supported by masonry (14). The base (6), or foundation (6), can be made of masonry (14). The net result is the sun's noon light (10) is means to smelt rocks, glass or metals (5), and to process chemicals (5), without the need for moving components. The invented device moves in zero degrees of freedom.

Figure 3:
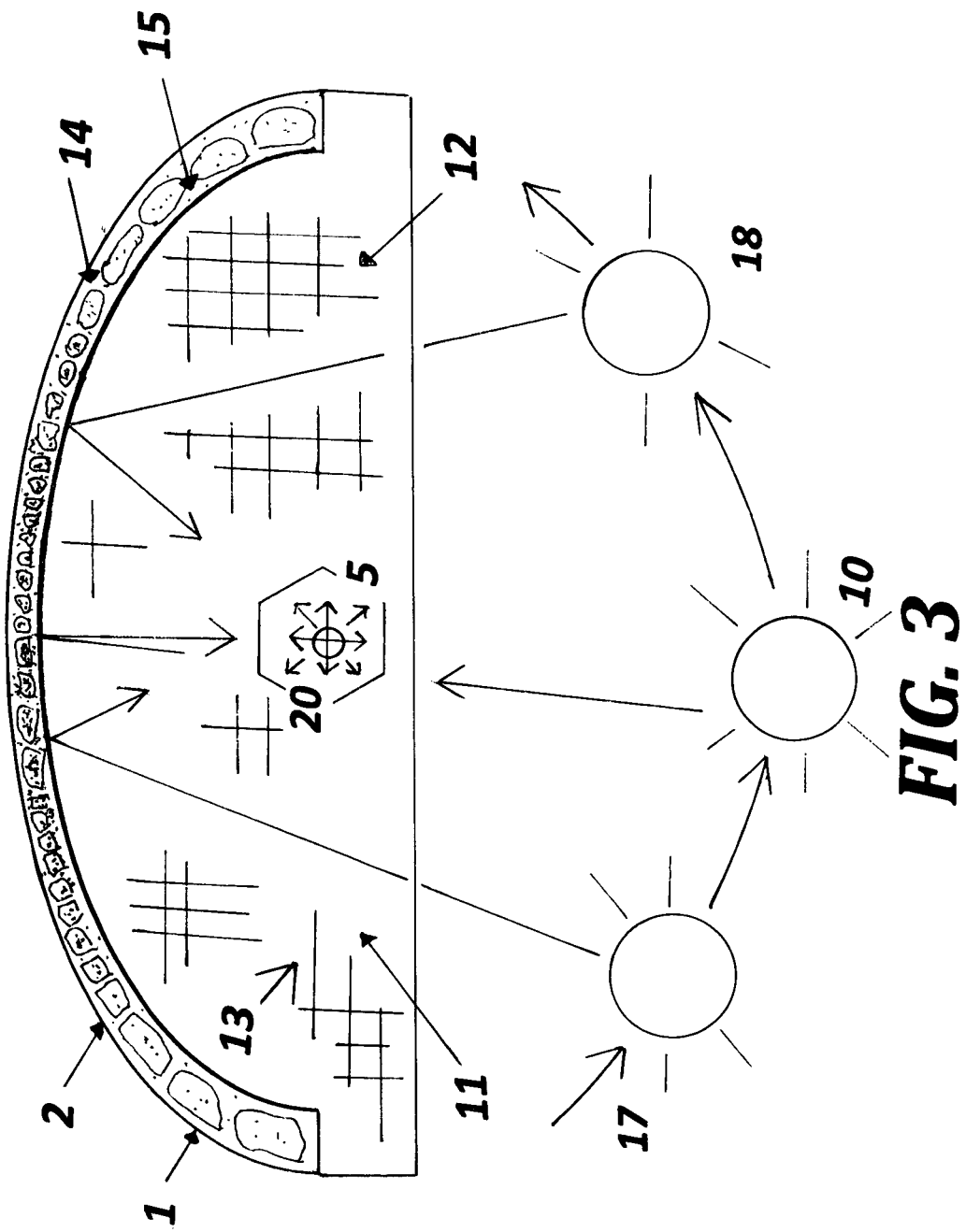
FIG. 3. Illustrates an overhead view of a revolution-of-a-parabolic-curve. The sun's light from the side, as from sunrise or late morning, is reflected from the wall of the revolution-of-a-parabolic-curve to the crucible to help pre-warm. The sun's light from the side, as from sunset or early afternoon, is reflected from the wall of the revolution-of-a-parabolic-curve to the crucible to help keep the crucible hot. Any of the sun's light, or stray rays, from the side not entering the crucible is reflected to the tiled-floor, thus helping to keep the earth hot. A factor is the diameter of the crucible. The larger the diameter, more of the sun's light from the side enters the crucible. The focal of the sun's light will move around inside the crucible, depending on the elevation of the sun's light and the season.

FIG. 3. Illustrates an overhead view of a revolution-of-a-parabolic-curve (1). The revolution-of-a-parabolic-curve (1) forms the reflecting-parabolic-splice-solar-smelter (2). The sun's light (17) from the side, as from sunrise or late morning, is redirected from the wall (15) to the crucible (5) to help pre-warm. The sun's light (18) from the side, as from sunset or early afternoon, is redirected from the wall (15) to the crucible (5) to help keep the crucible (5) hot. Any of the sun's light (13,17,18) from the side not entering the crucible (5) is redirected to the tiled-floor (12), thus helping to keep the earth (11) hot. A factor is the diameter of the crucible (5). The larger the diameter of the crucible (5), more of the sun's light (17, 18) from the side enters. The sun's noon light (10) is redirected from the interior wall (15) to the crucible (5). The focal (20) of the sun's light (10,17,18) will move around inside the crucible (5) as shown by the arrows, depending on the elevation of the sun's light (10,17,18) and season.

Figure 4:
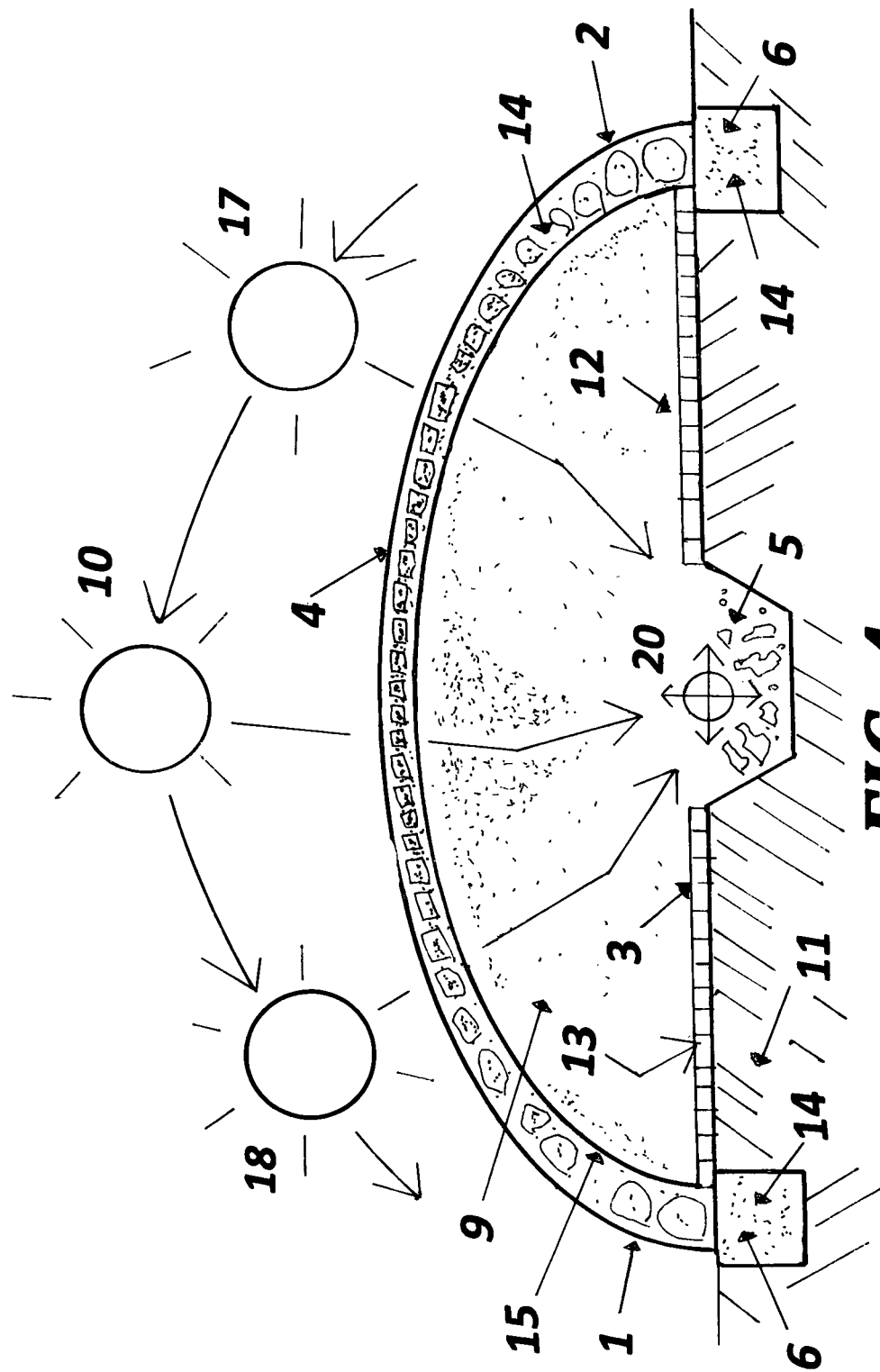
FIG. 4 illustrates a frontal view of the invented device. The sun's light from the side, as from sunrise or late morning, is reflected from the wall to the crucible to help pre-warm. The sun's light from the side, as from sunset or early afternoon, is reflected from the wall of the revolution-of-a-parabolic-curve to the crucible to help keep the crucible hot. Any of the sun's light from the side, or stray rays, not entering the crucible is reflected to the tiled-floor, thus helping to keep the earth hot. Shown is the sun's noon light. The sun's noon light is reflected from the interior wall of the reflecting-parabolic-splice-solar-smelter to the crucible. A factor is the diameter of the crucible. The larger the diameter of the crucible, more of the sun's light from the side enters the crucible. The focal of the sun's light will move around inside the crucible, depending on the elevation of the sun's light and season.

FIG. 4 illustrates a frontal view of the invented device. The sun's light (17) from the side, as from sunrise or late morning, is reflected from the wall (15) to the crucible (5) to help pre-warm. The sun's light (18) from the side, as from sunset or early afternoon, is redirected from the interior wall (15) of the reflecting-parabolic-splice-solar-smelter (2) to the crucible (5) to help keep the crucible (5) hot. Any of the sun's light from the side (10, 17, 18) not entering the crucible (5) is redirected to the tiled-floor (12), thus helping to keep the earth (11) hot. Any stray rays (13) are reflected to the tiled-floor (12). A factor is the diameter of the crucible (5). The larger the diameter of the crucible (5), more of the sun's light from the side (17, 18) enters. The focal (20) of the sun's light (10,17, 18) will move around inside the crucible (5), depending on the elevation of the sun's light (10,17,18) and season. Shown also is the sun's noon light (10). The sun's noon light (10) is redirected from the interior wall (15) of the reflecting-parabolic-splice-solar-smelter (2), and revolution-of-a-parabolic-curve (1), to the crucible (5). Shown also is the base (6), or foundation (6). Surrounding the exterior of the reflecting-parabolic-splice-solar-smelter (2) can be masonry (14). An open-void (9) is bounded by the interior of the reflecting-parabolic-solar-smelter (2), the first-plane (3) interior, and the second-plane (4) interior.

Figure 5:
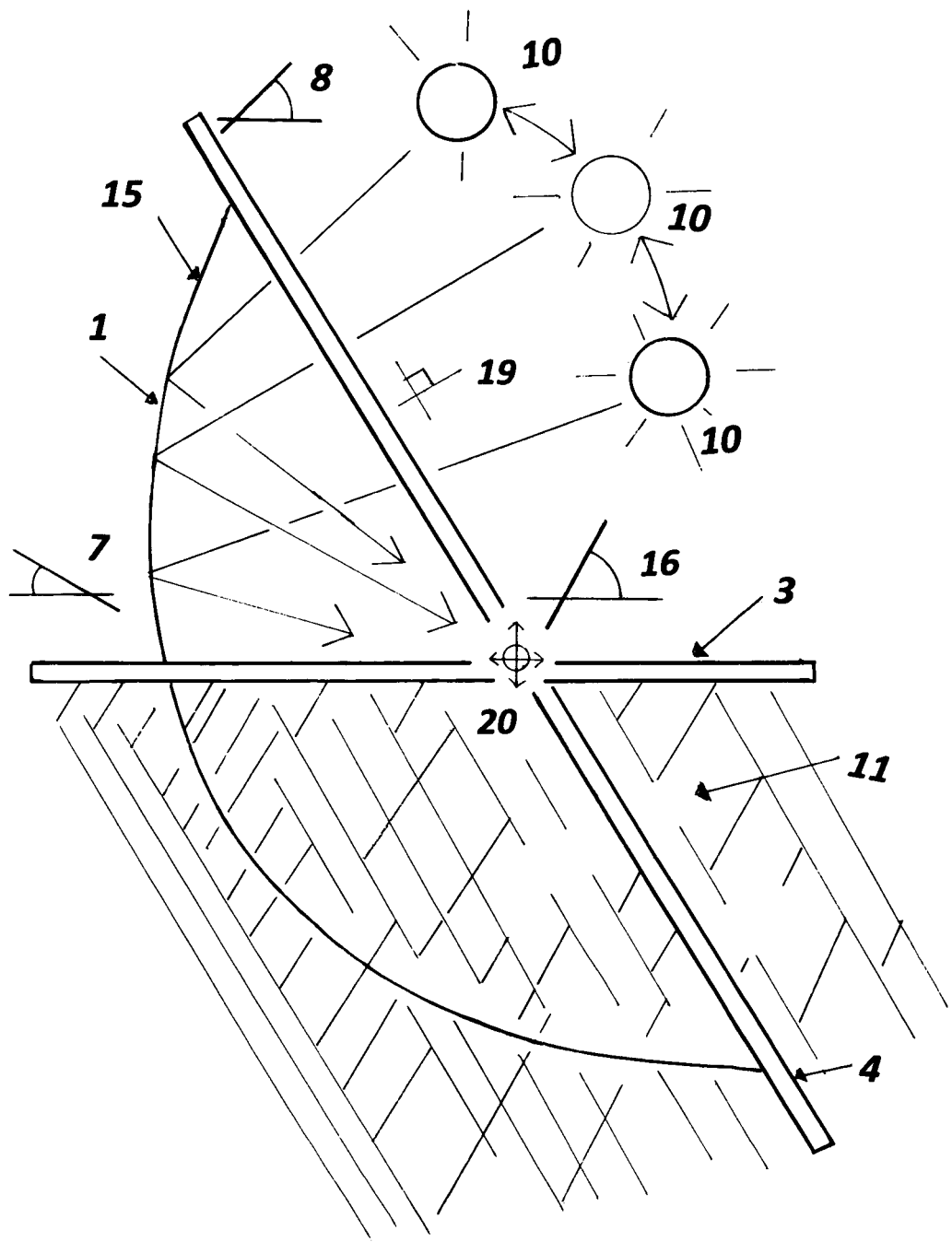
FIG. 5 illustrates a side view of a mathematical model of the invented device. Shown is a revolution-of-a-parabolic-curve, spliced by a first-plane. The first-plane splices the revolution-of-the-parabolic-curve at the approximately 30 degree tangent. The second-plane splices the revolution-of-the-parabolic curve at the approximately 45 degree tangent. Both the first-plane and second-plane intersect the revolution-of-a-parabolic-curve. Where the first-plane and second-plane intersect, the tilt is approximately 60 degrees. The revolution-of-a-parabolic-curve is tilted approximately 60 degrees, so as to capture the sun's noon light. The focal is centrally located at the focus of the revolution-of-a-parabolic-curve. Thus, creating the reflecting-parabolic-splice-solar-smelter.

FIG. 5 illustrates a mathematical side view of the invented device. Shown is a revolution-of-a-parabolic-curve (1), spliced by a first-plane (3). The first-plane (3) splices the revolution-of-the-parabolic-curve (1) at the approximately 30 degree tangent (7). The second-plane (4) splices the revolution-of-the-parabolic curve (1) at the approximately 45 degree tangent (8). Both the first-plane (3) and second-plane (4) intersect the revolution-of-a-parabolic-curve (1) to the wall (15) of the revolution-of-a-parabolic-curve (1). Where the first-plane (3) and second-plane (4) intersect, the tilt is approximately 60 degrees (16). The focal (20) is centrally located at the focus of the revolution-of-a-parabolic-curve (1). The sun's elevation may vary according to season. As shown by the arrows, the focal (20) moves around according to the orientation, elevation, and season. As shown by curved arrows, the sun's noon light (10) may be greater or less than the perpendicular to the tilt (19) to the second-plane (4). Portions of the revolution-of-a-parabolic-curve (1) are buried inside the earth (11).

The invention claimed is:

1. A reflecting-parabolic-splice-solar-smelter created by a parabolic-curve;
   said parabolic-curve rotated to form a revolution-of-a-parabolic-curve;
   the parabolic-curve rotated axially about a focal;
   the parabolic-curve spliced by a first-plane;
   said first-plane splices the parabolic-curve at an approximately 30 degree tangent;
   the first-plane splices the revolution-of-a-parabolic-curve created by said rotation;
   the parabolic-curve spliced by a second-plane;
   said second-plane splices the parabolic-curve at an approximately 45 degree tangent;
   the second-plane splices the revolution-of-a-parabolic-curve created by the rotation;
   the parabolic-curve rotated parallel and concentrically to the second-plane;
   the intersection of the first-plane angled from the second-plane at approximately 60 degrees at said focal;
   the approximately 45 degree tangent and the approximately 30 degree tangent angled at said approximately 60 degrees at the focal;
   the focal formed by the focus of the parabolic-curve;
   the focal formed by the focus of the revolution-of-a-parabolic-curve;
   an interior of the revolution-of-a-parabolic-curve creating a wall;
   said wall being reflective;
   the revolution-of-a-parabolic-curve interior, a first-plane interior and the second-plane form boundaries that create an open-void;
   said open-void is tilted approximately 60 degrees at the focal;
   the open-void capturing a sun's light;
   the revolution-of-a-parabolic-curve capturing said sun's light;
   the revolution-of-a-parabolic-curve is capable of reflecting the sun's light to the focal;
   the revolution-of-a-parabolic-curve reflecting the sun's light from sunset, sunrise, late morning, early morning, and noon to the focal;
   a crucible located at the focal;
   a tiled-floor to capture any stray rays not captured by said crucible;
   said tiled-floor parallel to the first-plane;
   the tiled-floor adjacent, and containing, centrally located, the crucible;
   the revolution-of-a-parabolic-curve is capable of reflecting the sun's light from sunset, sunrise, late morning, early afternoon, and noon to the tiled-floor;
   the revolution-of-a-parabolic-curve is capable of reflecting the sun's light from sunset, sunrise, late morning, early afternoon, and noon to the crucible;
   the revolution-of-a-parabolic-curve orient-able to the East or West direction;
   the open-void orient-able to the East or West direction;
   the exterior of the revolution-of-a-parabolic-curve is made of masonry;
   the splice of the first-plane and the revolution-of-a-parabolic-curve forming a base, or foundation;
   said base, or said foundation, is made of masonry;
   the revolution-of-a-parabolic-curve is static with zero degrees of freedom;
   the revolution-of-a-parabolic-curve is without the need for moving components;

the revolution-of-a-parabolic-curve creating said reflecting-parabolic-splice-solar-smelter;
the focal is formed by the focus of the reflecting-parabolic-splice-solar-smelter;
the reflecting-parabolic-splice-solar-smelter is capable of reflecting stray rays to the tiled-floor.

\* \* \* \* \*